United States Patent
Egami et al.

(10) Patent No.: US 9,023,472 B2
(45) Date of Patent: May 5, 2015

(54) AQUEOUS INK PIGMENT, AQUEOUS INK COMPOSITION CONTAINING THE SAME, AND IMAGES OR PRINTED MATTER THEREOF

(75) Inventors: Yukiko Egami, Tokyo (JP); Hiroko Wachi, Chiba (JP); Norio Nakayama, Chiba (JP); Hiroshi Maekawa, Ichihara (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/237,596

(22) PCT Filed: Aug. 8, 2012

(86) PCT No.: PCT/JP2012/005031
§ 371 (c)(1),
(2), (4) Date: Mar. 17, 2014

(87) PCT Pub. No.: WO2013/021633
PCT Pub. Date: Feb. 14, 2013

(65) Prior Publication Data
US 2014/0234595 A1    Aug. 21, 2014

(30) Foreign Application Priority Data

Aug. 8, 2011  (JP) ................................. 2011-172898
Apr. 13, 2012  (JP) ................................. 2012-091842

(51) Int. Cl.
| | | |
|---|---|---|
| *B32B 5/16* | (2006.01) | |
| *B32B 9/00* | (2006.01) | |
| *B32B 15/02* | (2006.01) | |
| *B32B 17/02* | (2006.01) | |
| *B32B 19/00* | (2006.01) | |
| *B32B 21/02* | (2006.01) | |
| *B32B 23/02* | (2006.01) | |
| *C09C 1/36* | (2006.01) | |
| *B41M 3/00* | (2006.01) | |
| *C09C 1/00* | (2006.01) | |
| *C09D 11/322* | (2014.01) | |
| *C09D 17/00* | (2006.01) | |
| *C09C 3/04* | (2006.01) | |
| *B82Y 30/00* | (2011.01) | |

(52) U.S. Cl.
CPC ............... *C09C 1/3661* (2013.01); *B82Y 30/00* (2013.01); *B41M 3/00* (2013.01); *Y10T 428/24901* (2015.01); *C09C 1/0084* (2013.01); *C09C 1/3607* (2013.01); *C01P 2002/54* (2013.01); *C01P 2006/10* (2013.01); *C09D 11/322* (2013.01); *C09D 17/008* (2013.01); *C09C 3/041* (2013.01); *C01P 2004/51* (2013.01); *C01P 2004/62* (2013.01); *C01P 2006/12* (2013.01); *C01P 2006/14* (2013.01); *C01P 2006/22* (2013.01)

(58) Field of Classification Search
CPC ................................. B41M 3/00; B82Y 30/00
USPC ................................................... 428/402, 32.1
See application file for complete search history.

(56) References Cited

U.S. PATENT DOCUMENTS

2006/0167135 A1 * 7/2006 Beach et al. ................... 523/160

FOREIGN PATENT DOCUMENTS

| JP | H-09-296130 A | 11/1997 |
|---|---|---|
| JP | H-10-130527 A | 5/1998 |
| JP | 2003-160741 A | 6/2003 |
| JP | 2004-339388 A | 12/2004 |
| JP | 2008-200854 A | 9/2008 |
| JP | 2010-174100 A | 8/2010 |

OTHER PUBLICATIONS

International Search Report (in English) for PCT/JP2012/005031, mailed Sep. 11, 2012; ISA/JP.

* cited by examiner

*Primary Examiner* — Betelhem Shewareged
(74) *Attorney, Agent, or Firm* — Harness, Dickey & Pierce, P.L.C.

(57) ABSTRACT

The aqueous ink white pigment of the present embodiment contains a metal compound (1) which satisfies the following specific conditions of (A), (B), and (C).
  (A) The metal compound (1) described above includes titanium dioxide, and a metal compound (2) where a refractive index at a wavelength of 550 nm is 1.60 or more and 2.45 or less,
    when the total of the titanium dioxide described above and the metal compound (2) described above is 100 wt %, the content of the titanium dioxide described above is 50 wt % or more and 99 wt % or less and the content of the metal compound (2) described above is 1 wt % or more and 50 wt % or less.
  (B) The peak value of the volume particle size distribution of the metal compound (1) which is measured with a dynamic light scattering method is in a range of 100 to 700 nm.
  (C) The pore volume of the metal compound (1) described above which is calculated with the BJH (Barrett-Joyner-Halenda) method is 0.1 ml/g or more and 0.65 ml/g or less.

7 Claims, No Drawings

AQUEOUS INK PIGMENT, AQUEOUS INK COMPOSITION CONTAINING THE SAME, AND IMAGES OR PRINTED MATTER THEREOF

TECHNICAL FIELD

The present invention relates to an aqueous ink pigment, an aqueous ink composition containing the same, and images or printed matter thereof.

BACKGROUND ART

In recent years, ink jet printing has attracted attention as a method of forming images such as text, pictures, and patterns on substrates such as transparent films. Ink jet printing is a printing method where printing is performed by causing small droplets of ink to fly and attach to a recording medium such as paper. In a case where printing is performed on such a substrate, it is necessary to cover the base in order to improve the color of the printed matter. In order to cover the base, the use of a white ink with a high covering property is typical, and inorganic pigments, in particular, titanium dioxide, are often used as the pigments therein.

RELATED DOCUMENT

Patent Document

[Patent Document 1] Japanese Unexamined Patent Application No. 10-130527
[Patent Document 2] Japanese Unexamined Patent Application No. 2008-200854
[Patent Document 3] Japanese Unexamined Patent Application No. 2010-174100

DISCLOSURE OF THE INVENTION

However, since inorganic pigments such as titanium dioxide have a high specific gravity, the suppression of pigment precipitation is a problem in the case of use in an ink jet ink with a low viscosity. When the pigment is precipitated, there are problems in that dogging may occur during the discharging from the ink jet nozzles, the storage stability of the ink may become poor, and the like.

When the particle diameter of the titanium dioxide is reduced in order to suppress the pigment precipitation, it is possible to reduce the precipitation; however, there is a problem in that, since the white color property is decreased, the covering property is also decreased whereby the covering ability of the white ink decreases significantly.

Patent document 1 discloses that it is possible to obtain a white pigment with an excellent dispersion property by coating porous silica on the surface of titanium dioxide particles. However, when coated with silica with a small refractive index, there is a problem in that the whiteness is decreased. In addition, silica is known to be easily dissolved in alkalis and there is a problem in that it is not possible to select wide ink adjustment conditions.

Patent document 2 discloses a method where a white solid color coating layer is formed by a porous titanium dioxide pigment using an ink jet system. However, although the details of the titanium dioxide in this case are not described, there is a problem in that titanium dioxide pigments are typically easily precipitated and the storage stability over long periods is poor.

Patent document 3 discloses that it is possible to preserve the whiteness and ensure the storage stability by using a silica with a specific gravity which is lower than titanium dioxide. However, since silica is inferior to titanium dioxide in whiteness and the covering property, it is necessary to also use titanium dioxide and there is a problem in that it is difficult to ensure the storing stability as a result.

The present invention has been made in view of the problems described above and provides an aqueous ink pigment which does not easily precipitate in an aqueous ink medium and has a favorable white color property, an aqueous ink composition which contains the same, and images or printed matter which are obtained using the aqueous ink composition.

As the result of intensive studies in order to achieve the above object, the present inventors found that it is possible to obtain an aqueous ink pigment which does not easily precipitate in an aqueous ink medium and has a favorable white color property when a metal compound which satisfies specific conditions is contained, thereby completing the present invention.

That is, according to the present invention, there are provided the aqueous ink pigment, the aqueous ink composition which contains the same, and the images or printed matter which are obtained using the aqueous ink composition as shown below.

[1] An aqueous ink white pigment which contains a metal compound (1) which satisfies the following conditions of (A), (B), and (C).

(A) The metal compound (1) described above includes titanium dioxide, and a metal compound (2) where a refractive index at a wavelength of 550 nm is 1.60 or more and 2.45 or less, when the total of the titanium dioxide described above and the metal compound (2) described above is 100 wt %, the content of the titanium dioxide described above is 50 wt % or more and 99 wt % or less, and the content of the metal compound (2) described above is 1 wt % or more and 50 wt % or less.

(B) The peak value of the volume particle size distribution of the metal compound (1) described above which is measured with a dynamic light scattering method is in a range of 100 to 700 nm.

(C) The pore volume of the metal compound (1) described above which is calculated with the BJH (Barrett-Joyner-Halenda) method is 0.1 ml/g or more and 0.65 ml/g or less.

[2] The aqueous ink white pigment according to [1] described above, where the specific gravity of the metal compound (2) described above is 3.0 g/cm$^3$ or more and 6.0 g/cm$^3$ or less.

[3] The aqueous ink white pigment according to [1] or [2] described above, where the metal compound (2) described above is zirconium dioxide.

[4] The aqueous ink white pigment according to any of [1] to [3] described above, where, in X-ray diffraction measurement of the aqueous ink white pigment using CuKα rays, a peak intensity ratio $I_b/I_a$ is 0.02 or less when the strongest peak intensities of diffraction rays which are derived from the titanium dioxide described above and the metal compound (2) described above are respectively set to $I_a$ and $I_b$.

[5] An aqueous ink composition which contains the aqueous ink white pigment according to any of [1] to [4] described above.

[6] The aqueous ink composition according to [5] described above, where the aqueous ink composition is for ink jet printing.

[7] Images or printed matter where the aqueous ink composition according to [5] or [6] described above is printed on a substrate.

According to the present invention, it is possible to provide an aqueous ink white pigment which does not precipitate easily in an aqueous ink medium and which has a favorable white color property. In addition, the aqueous ink composition which contains the aqueous ink pigment of the present invention has excellent storage stability. In addition, a coating film which is obtained from the aqueous ink composition of the present invention has excellent whiteness and/or covering property.

DESCRIPTION OF EMBODIMENTS

The object described above, other objects, characteristics, and advantages will be made more apparent by the favorable embodiments which are described below.

Below, description will be given in order of the aqueous ink pigment of the present embodiment, the aqueous ink composition which contains the same, and the images or printed matter thereof. In addition, unless otherwise stated, "to" represents from A or more to B or less.

1. Aqueous Ink White Pigment
(Metal Compound)

The aqueous ink white pigment of the present embodiment contains a metal compound (1) which satisfies specific conditions. The metal compound (1) of the present embodiment includes titanium dioxide, and a metal compound (2) where a refractive index at a wavelength of 550 nm is 1.60 or more and 2.45 or less.

The refractive indices of titanium dioxide are 2.52 for the anatase type and 2.71 for the rutile type.

Examples of metal compound (2) where the refractive index at a wavelength of 550 nm is 1.60 or more and 2.45 or less include $CeO_2$ (refractive index 2.2), zirconium dioxide (refractive index 2.05), zinc sulfide (refractive index 2.38), ZnO (refractive index 1.95), $Y_2O_3$ (refractive index 1.87), white lead (refractive index 2.01), magnesium oxide (refractive index 1.74), aluminum oxide (refractive index 1.63), $BaSO_4$ (refractive index 1.60), $3Zr4$ $(PO_4)$ (refractive index 1.73), $ZrP_2O_7$ (refractive index 1.68), $(ZrO) 2P_2O_7$ (refractive index 1.73), $(ZrO) 2P_2O_7$ (refractive index 1.78), $Zr (PO_3)_4$ (refractive index 1.64), and the like.

It is known that the whiteness is greater as the refractive index is higher. In addition, it is known that the refractive index is based on the additive property and that the refractive index is decreased when a material with a small refractive index is mixed with a material with a large refractive index. In the present embodiment, with respect to the refractive index of titanium dioxide, the whiteness is the same level or improved regardless of adding the metal compound (2) with a low refractive index.

The crystal particle size of the metal compound (1) of the present embodiment which is determined using the Debye-Scherrer method of powder X-ray analysis is not particularly limited; however, it is possible to set 4 nm or more and 50 nm or less, preferably 4 nm or more and 15 nm or less, and particularly preferably 5 nm or more and 10 nm or less. When the crystal particle size of the metal compound (1) of the present embodiment which is determined using the Debye-Scherrer method of powder X-ray analysis is 4 nm or more, visible light scattering is likely to occur and the whiteness is improved, which is preferable, and when 15 nm or less, the dispersibility is improved, which is preferable. In addition, in order to further improve the whiteness, it is possible to set the crystal particle size to 15 nm or more, in particular, 30 nm or more. It is possible for the crystal particle size of the metal compound (1) of the present embodiment which is determined using the Debye-Scherrer method of powder X-ray analysis to be controlled using firing conditions, and when the firing temperature is high and the firing time is long, the crystal particle size has a tendency to increase.

The specific gravity of metal compound (2) is preferably 0.3 $g/cm^3$ or more and 6.0 $g/cm^3$ or less, and more preferably 3.95 $g/cm^3$ or more and 6.0 $g/cm^3$ or less. Examples of the metal compound (2) include zirconium dioxide (specific gravity 5.69), zinc sulfide (specific gravity 4.0), ZnO (specific gravity 5.6), $Y_2O_3$ (specific gravity 5.03), aluminum oxide (specific gravity 3.97), $BaSO_4$ (specific gravity 4.45), $3Zr4$ $(PO_4)$ (specific gravity 3.32), $ZrP_2O_7$ (specific gravity 3.14), $(ZrO) 2P_2O_7$ (specific gravity 3.53), $(ZrO) 2P_2O_7$ (specific gravity 3.88), $Zr (PO_3)_4$ (specific gravity 3.18), and the like. Zirconium dioxide is particularly preferable among the metal compounds (2).

For the metal compound (1) of the present embodiment, the content of titanium dioxide is 50 wt % or more and 99% wt % or less with respect to the total weight of the titanium dioxide and the metal compound (2), and the content of the metal compound (2) is 1 wt % or more and 50 wt % or less. The content of titanium dioxide is preferably 60 wt % or more and 95% wt % or less and the content of the metal compound (2) is 5 wt % or more and 40 wt % or less and the content of titanium dioxide is particularly preferably 70 wt % or more and 90% wt % or less and the content of the metal compound (2) is 10 wt % or more and 30 wt % or less.

The metal compound (1) of the present embodiment need not include components other than the titanium dioxide and the metal compound (2), but other components may be included in ranges which do not impair the effects of the present invention. The content thereof is not particularly limited; however, for example, the content may be a range of 0 wt % or more and 10 wt % or less with respect to the total weight of the titanium dioxide and the metal compound (2).

Furthermore, in a case where the metal compound (1) of the present embodiment is used as an ink jet pigment, in order to perform stable discharging from the ink jet nozzles without clogging and to preserve the whiteness of the coating film and the covering property, the storage stability is preferably preserved with the peak value of the volume particle size distribution which is measured by the dynamic light scattering method being in the range of 100 to 700 nm. The specific gravity of metal compounds such as titanium dioxide is generally high; nevertheless, in the present embodiment, it is possible to form an aqueous ink white pigment where the pigment does not easily precipitate in the ink even in the above particle diameter range.

The peak value of the volume particle size distribution of the metal compound (1) of the present embodiment which is measured by the dynamic light scattering method is in the range of 100 to 700 nm, preferably in a range of 150 to 400 nm. When the peak value of the volume particle size distribution of the metal compound (1) is 100 nm or more, since the scatterability of visible light is improved, it is possible to further improve the whiteness. When the particle diameter peak of the metal compound (1) is 700 nm or less, it is possible to suppress the occurrence of clogging in the ink jet nozzles.

It is possible for the pore characteristics of the metal compound (1) of the present embodiment to be determined by nitrogen adsorption. It is possible to calculate the specific surface area using the BET (Brunauer-Emmett-Teller) method and the total pore volume using the BJH (Barrett-Joyner-Halenda) method by the nitrogen adsorption-desorption measurement of the particles. Furthermore, it is possible to calculate the porosity by the total pore volume.

The pore volume of the metal compound (1) of the present embodiment is 0.1 ml/g or more and 0.65 ml/g or less, preferably 0.2 ml/g or more and 0.65 ml/g or less. Since the apparent specific gravity is reduced as the pore volume increases, the precipitation is less likely to occur. When the pore volume is 0.1 ml/g or more, the precipitation is less likely to occur. In addition, when the pore volume is 0.65 ml/g or less, it is possible to maintain the structure.

The specific surface area of the metal compound (1) of the present embodiment is not particularly limited; however, 70 m$^2$/g or more and 250 m$^2$/g or less is preferable and 100 m$^2$/g or more and 200 m$^2$/g or less is more preferable.

The porosity of the metal compound (1) of the present embodiment is not particularly limited; however, 20% or more and 90% or less is preferable, and 30% or more and 85% or less is more preferable.

When the strongest peak intensities of the diffraction rays which are derived from the titanium dioxide described above and the metal compound (2) described above are set as Ia and Ib respectively in the X-ray diffraction measurement of the white pigment of the present embodiment using CuKα rays, it is preferable that the intensity ratio Ib/Ia be 0.02 or less from the point of view of improving the dispersibility and the redispersibility of the pigment.

It is presumed that this is because, since the metal compound (2) is amorphous, an OH group is present or an OH group is easily generated when the pigment is dispersed in a dispersion medium, and the affinity with the dispersion medium is improved. Examples of the method of decreasing the intensity ratio Ib/Ia include, for example, methods of lowering the firing temperature in step (c) which will be described later.

(Method of Manufacturing Aqueous Ink White Pigment)

It is possible to manufacture the aqueous ink white pigment which includes the metal compound (1) of the present embodiment using a method which includes the following steps (a), (b), and (c). Furthermore, step (d) may be performed after step (c).

Step (a): the following step (a-1), step (a-2), and step (a-3) are performed.

Step (a-1): a sol-gel reaction of a metal compound precursor (Y) (referred to below as "component (Y)") is performed.

Step (a-2): a mixture which contains metal compound nanoparticles and an aqueous solution is prepared.

Step (a-3): the titanium dioxide is surface treated with the metal compound (2) or a precursor thereof.

Step (b): the reaction liquid or the mixture which are obtained in step (a) are dried and a powder is obtained.

Step (c): the powder which is obtained in step (b) is fired and a metal compound (1) is obtained.

Step (d): the metal compound (1) which is obtained in step (c) is wet milled to a desired particle diameter, dispersed into water, and an aqueous dispersion is obtained.

In addition, in the manufacturing method described above, organic polymer particles may or may not be used as a mold where the pores are adjusted. The organic polymer particles which are used as the mold are fired and removed in step (c).

Examples of the organic polymer particles include at least one type of water-insoluble polymer particles which is selected from polyolefin-based polymer particles, poly(meth) acrylic acid ester-based polymer particles, polystyrene-based polymer particles, polyurethane-based polymer particles, polyacrylonitrile-based polymer particles, polyvinyl chloride-based polymer particles, polyvinylidene chloride-based polymer particles, polyvinyl acetate-based polymer particles, and polybutadiene-based polymer particles. Examples of the polyolefin-based polymer particles include the terminal branched copolymer particles in WO2010/103856.

Below, each of the steps will be described in order.

[Step (a)]

[Step (a-1)]

In step (a-1), a mixed composition is prepared by mixing a titanium dioxide precursor, the metal compound (2) or a precursor thereof, water, and/or a solvent (Z) which dissolves water partially or entirely at an arbitrary ratio (referred to below as "component (Z)"), and causes a sol-gel reaction with the metal compound precursor described above. Here, a sol-gel reaction catalyst (W) may be included in the mixed composition with the object of promoting a hydrolysis and polycondensation reaction in the metal alkoxide.

[Metal Compound Precursor (Y)]

Examples of the metal compound precursor include the titanium dioxide precursors, and the precursors of the metal compound (2).

Examples of the metal compound precursor include metal alkoxides and/or partial hydrolysis condensates thereof, metal halides, metal acetates, metal nitrates, and metal sulfates.

The metal alkoxides in the present embodiment are represented by the following formula (1).

$$(R^1)xM(OR^2)y \qquad (1)$$

In the formula, $R^1$ represents a hydrogen atom, an alkyl group (methyl group, ethyl group, propyl group, or the like), an aryl group (phenyl group, tolyl group, or the like), a carbon-carbon double bond-containing organic group (acryloyl group, methacryloyl group, vinyl group, or the like), or a halogen-containing group (halogenated alkyl group such as a chloropropyl group, or a fluoromethyl group). $R^2$ represents a lower alkyl group which has 1 or more and 6 or less carbon atoms, preferably, 1 or more and 4 or less carbon atoms. Regarding x and y, x+y=4 and x represents an integer which is 2 or less.

Examples of M include metals such as titanium (Ti), zirconium (Zr), zinc (Zn), cerium (Ce), yttrium (Y).

Examples of the metal alkoxides include titanium methoxide, titanium ethoxide, titanium-n-propoxide, titanium-i-propoxide, titanium-n-butoxide, titanium-t-butoxide, zirconium methoxide, zirconium ethoxide, zirconium-n-propoxide, zirconium-i-propoxide, zirconium-n-butoxide, zirconium-t-butoxide, zinc methoxide, zinc ethoxide, zinc-n-propoxide, zinc-t-propoxide, zinc-n-butoxide, zinc-t-butoxide, cerium methoxide, cerium ethoxide, cerium-n-propoxide, cerium-t-propoxide, cerium-n-butoxide, cerium-t-butoxide, yttrium methoxide, yttrium ethoxide, yttrium-n-propoxide, yttrium-i-propoxide, yttrium-n-butoxide, yttrium-t-butoxide, and the like.

The partially hydrolyzed condensate of the metal alkoxide is a compound which is obtained by being partially hydrolyzed using a sol-gel reaction catalyst (W) in one or more types of these metal alkoxides and then undergoing polycondensation, for example, a partially hydrolyzed polycondensation compound of a metal alkoxide.

In the present embodiment, as a partially hydrolyzed condensate of the metal alkoxide, condensates of alkoxy titanium and condensates of alkoxy zirconium are preferable.

As the metal halide in the present embodiment, it is possible to use those represented by the following formula (2).

$$(R^1)xMZy \qquad (2)$$

In the formula, $R^1$ represents a hydrogen atom, an alkyl group (a methyl group, an ethyl group, a propyl group, or the like), an alkoxy group (a methoxy group, an ethoxy group, a propoxy group, a butoxy group, or the like), an aryl group (a phenyl group, a tolyl group, or the like), a carbon-carbon double bond-containing organic group (an acryloyl group, a methacryloyl group, a vinyl group, or the like), a halogen-containing group (a halogenated alkyl group such as a chloropropyl group or a fluoromethyl group). Z represents F, Cl, Br, and I. Regarding x and y, x+y≤4 and x represents an integer which is 2 or less. Examples of M include titanium (Ti), zirconium (Zr), zinc (Zn), cerium (Ce), yttrium (Y), and the like.

Specific examples include titanium halide, zirconium halide, zinc halide, cerium halide, yttrium halide, and hydrates thereof.

Examples of the metal acetates include titanium acetate, zirconium acetate, zinc acetate, cerium acetate, yttrium acetate, or hydrates thereof.

Examples of the metal nitrates include titanium nitrate, zirconium nitrate, zinc nitrate, cerium nitrate, yttrium nitrate, or hydrates thereof.

Examples of the metal sulfates include titanium sulfate, zirconium sulfate, zinc sulfate, cerium sulfate, yttrium sulfate, or hydrates thereof.

[Water, and/or Solvent (Z) which Dissolves Water Partially or Entirely at an Arbitrary Ratio]

In the mixed composition of the present embodiment, the component (Z) is added with object of further hydrolyzing the metal compound precursor (Y).

In addition, the component (Z) includes both solvents which are used when component (Y) and a sol-gel reaction catalyst (W) (referred to below as "component (W)") which will be described later are mixed.

The water is not particularly limited and it is possible to use distilled water, ion-exchanged water, municipal water, industrial water, and the like; however, it is preferable to use distilled water or ion-exchanged water.

The solvent which dissolves water partially or entirely at an arbitrary ratio is not particularly limited as long as it is an organic solvent which has an affinity with water and where it is possible to disperse water-insoluble organic polymer particles. Examples thereof include methanol, ethanol, propyl alcohol, isopropyl alcohol, acetone, acetonitrile, dimethyl sulfoxide, dimethyl formamide, dimethylimidazolidinone, ethylene glycol, tetraethylene glycol, dimethylacetamide, N-methyl-2-pyrrolidone, tetrahydrofuran, dioxane, methyl ethyl ketone, cyclohexanone, cyclopentanone, 2-methoxyethanol(methyl cellosolve), 2-ethoxyethanol(ethyl cellosolve), ethyl acetate, and the like. Among these, methanol, ethanol, propyl alcohol, isopropyl alcohol, acetonitrile dimethyl sulfoxide, dimethyl formamide, acetone, tetrahydrofuran, and dioxane are preferable due to having a high affinity for water.

In a case where water is used, the amount of water to be added is normally in a range of 1 part by weight or more and 1000000 parts by weight or less with respect to 100 parts by weight of the mixture of component (Y) described above and component (W) described above, preferably in a range of 10 parts by weight or more and 10000 parts by weight or less.

As the solvent which dissolves water partially or entirely at an arbitrary ratio, the amount of the solvent to be added is normally in a range of 1 part by weight or more and 1000000 parts by weight or less with respect to 100 parts by weight of the mixture of component (Y) described above and component (W) described above, preferably in a range of 10 parts by weight or more and 10000 parts by weight or less.

In addition, the preferable reaction temperature during the hydrolysis polycondensation of the metal alkoxides is 1° C. or more and 100° C. or less, more preferably 20° C. or more and 60° C. or less, and the reaction time is 10 minutes or more and 72 hours or less, more preferably 1 hour or more and 24 hours or less.

[Sol-Gel Reaction Catalyst (W)]

With the object of promoting the reaction in the hydrolysis and polycondensation reaction of the metal alkoxides, the mixed composition which is used in the present embodiment may include hydrolysis and polycondensation reaction catalysts as shown below.

Those used as the catalysts for a hydrolysis and polymerization reaction of the metal alkoxides are the catalysts used in general sol-gel reactions, which are described in "Recent Technology for Functional Thin Film Production According to Sol-Gel Method" (Hirashima, Shuo, Comprehensive Technology Center Co., Ltd., p. 29), "Science of Sol-Gel Method" (Sumio Sumiotto, Agne Shofu Publishing Inc., p. 154), or the like.

Examples of the catalyst (W) include acid catalysts, alkali catalysts, organic tin compounds, metal alkoxides such as titanium tetraisopropoxide, diisopropoxy titanium bisacetylacetonate, zirconium tetrabutoxide, zirconium tetrakis acetylacetonate, aluminum triisopropoxide, aluminum tris ethyl acetonate, trimethoxyborane, and the like.

Among these catalysts, acid catalysts and alkali catalysts are preferably used. Specifically, examples of the acid catalysts include inorganic and organic acids such as hydrochloric acid, nitric acid, sulfuric acid, phosphoric acid, acetic acid, oxalic acid, tartaric acid, and toluene sulfonic acid, and examples of the alkali catalysts include alkali metal hydroxides such as ammonium hydroxide, potassium hydroxide, and sodium hydroxide; quaternary ammonium hydroxides such as tetramethyl ammonium hydroxide, tetraethyl ammonium hydroxide, and tetrabutyl ammonium hydroxide; amines such as ammonia, triethylamine, tributylamine, morpholine, pyridine, piperidine, ethylenediamine, diethylenetriamine, ethanolamine, diethanolamine, and triethanolamine; aminosilanes such as 3-aminopropyltriethoxysilane, N-(2-aminoethyl)-3-aminopropyltrimethoxysilane; and the like.

From the point of view of reactivity, it is preferable to use an acid catalyst such as hydrochloric acid, nitric acid, or the like where the reaction proceeds comparatively mildly. The amount of acid catalyst to be used is preferably 0.001 mol or more and 0.05 mol or less with respect to 1 mol of the metal alkoxide of component (Y) described above, more preferably 0.001 mol or more and 0.04 mol or less, and even more preferably 0.001 mol or more and 0.03 mol or less.

It is possible for the mixed composition of step (a-1) to be used in the form of a sol-gel reaction product which is obtained by a sol-gel reaction in the presence of the catalyst (W) without removing the solvent (Z).

[Step (a-2)]

In step (a-2), a mixture which contains metal compound nanoparticles and an aqueous solution is prepared.

The metal compound nanoparticles which are selected in the present embodiment include titanium dioxide ($TiO_2$), and further include the metal compound (2). Examples of the metal compound (2) include zirconium dioxide ($ZrO_2$), zinc oxide (ZnO), zinc sulfide (ZnS), yttrium oxide ($Y_2O_3$), magnesium oxide (MnO), aluminum oxide, barium sulfate, and the like. The metal compound (2) may be one type or two or more types.

Examples of the metal compound nanoparticles include particles which form a structure where one or more types of inorganic substances are coated on the surface of one type of inorganic ultrafine particles (a core-shell structure), and particles which form a crystal structure using two or more types of components.

The particle diameter of the metal compound nanoparticles is preferably 1 nm or more and 50 nm or less, more preferably 1 nm or more and 20 nm or less, and even more preferably 1 nm or more and 10 nm or less.

In addition, the manufacturing methods of the metal compound nanoparticles are broadly divided into grinding methods and synthetic methods. Furthermore, examples of the synthetic methods include gas-phase methods such as an evaporation-condensation method and a gas-phase reaction method, and liquid-phase methods such as a colloid method, a homogeneous precipitation method, a hydrothermal synthesis method, and a microemulsion method.

The manufacturing method of the metal compound nanoparticles which are used in the present embodiment is not particularly limited; however, a method of manufacturing using a synthetic method is preferable from the point of view of particle diameter, uniformity of the composition, impurities, and the like.

The respective metal compound nanoparticles are preferably dispersed in water or the like in colloidal form or slurry form, and in order to stably preserve the dispersion, dispersion stabilizing may be performed using a method such as adding silane coupling agents such as γ-glycidoxypropyltrimethoxysilane or methacryloyloxy propyl trimethoxysilane, organic acids such as carboxylic acids, or polymers such as polyvinylpyrrolidone and polyvinyl alcohol, and chemically bonding (surface modifying) the above to the microparticle surface.

Examples of the aqueous solution which disperses the metal compound nanoparticles include water and/or solvents which dissolve water partially or entirely at an arbitrary ratio. The water is not particularly limited and it is possible to use distilled water, ion-exchanged water, municipal water, industrial water, and the like. In particular, it is preferable to use distilled water or ion-exchanged water.

The solvent which dissolves water partially or entirely at an arbitrary ratio is not particularly limited as long as it is an organic solvent which has an affinity with water. Examples thereof include methanol, ethanol, propyl alcohol, isopropyl alcohol, acetone, acetonitrile, dimethyl sulfoxide, dimethyl formamide, dimethylimidazolidinone, ethylene glycol, tetraethylene glycol, dimethylacetamide, N-methyl-2-pyrrolidone, tetrahydrofuran, dioxane, methyl ethyl ketone, cyclohexanone, cyclopentanone, 2-methoxyethanol(methyl cellosolve), 2-ethoxyethanol(ethyl cellosolve), ethyl acetate, and the like. Among these, methanol, ethanol, propyl alcohol, isopropyl alcohol, acetonitrile, dimethyl sulfoxide, dimethyl formamide, acetone, tetrahydrofuran, and dioxane are preferable due to having a high affinity with water.

[Step (a-3)]

In step (a-3), the titanium dioxide particles are surface treated with the metal compound (2) or a precursor thereof. The surface treatment refers to attaching, supporting, or coating a surface treatment agent to the surface of the titanium dioxide particles.

It is possible to manufacture the titanium dioxide using a variety of known methods, for example, a sulfuric acid method, a chlorine method, or the like. In addition, commercially available titanium dioxide may be used.

Among the above, in the sulfuric acid method, a titanium sulfate solution is typically obtained by leaching from titanium-containing ore using sulfuric acid, and a precipitate of hydrous titanium is obtained by hydrolysis of the titanium sulfate solution. Then, titanium dioxide having a desired crystal structure is obtained by firing the precipitate in the presence of suitable additives. At this time, it is possible to impart a film of metal oxide by surface treatment. When the titanium dioxide which is obtained in this manner is finally adjusted to the desired particle diameter by grinding, the titanium dioxide particles are obtained according to the object.

On the other hand, with the chlorine method, when titanium dioxide which is obtained by the vapor phase oxidation of halogenated titanium such as titanium tetrachloride at high temperature is finally ground and adjusted to the desired particle diameter, the titanium dioxide particles are obtained according to the object.

The primary particle diameter of the titanium dioxide is not particularly limited; however, it is possible to set the diameter to 10 to 200 nm. In particular, when the primary particle diameter is 60 nm or more, the whiteness is further improved, which is preferable.

Prior to surface treatment with the metal compound (2) or a precursor thereof, it is preferable to surface-treat the titanium dioxide particles with an inorganic phosphoric acid compound.

Specific examples of the inorganic phosphoric acid compounds include, in addition to phosphoric acid, ammonium phosphate, diammonium hydrogen phosphate, triammonium hydrogen phosphate, potassium phosphate, calcium hydrogen phosphate, monosodium phosphate, dipotassium hydrogen phosphate, tripotassium hydrogen phosphate, and the like, pyrophosphoric acid, tripolyphosphoric acid, tetrapolyphosphoric acid, trimetaphosphoric acid, tetrametaphosphoric acid, hexametaphosphoric acid, and salts thereof. Here, in the present embodiment, two or more types of the various types of inorganic phosphate compounds described above may be used in combination.

Among these phosphoric acid compounds, phosphoric acid, ammonium phosphate, diammonium hydrogen phosphate, and triammonium hydrogen phosphate are more preferable. In particular, ammonium salt of phosphoric acid is preferable.

Examples of the processing methods include a method of mixing titanium dioxide particles and the inorganic phosphoric acid compound in a solution such as water, a method of mixing dried titanium dioxide particles and the inorganic phosphoric acid compound, a method of spraying the inorganic phosphoric acid compound onto the titanium dioxide, a method of immersing the titanium dioxide in the inorganic phosphoric acid compound, and the like.

In the titanium dioxide which is surface treated with the inorganic phosphoric acid compound of the present embodiment, preferably more than 1 mass % and less than or equal to 30 mass % of the titanium dioxide is treated using the phosphoric acid compounds described above, more preferably more than 5 mass % and less than or equal to 20 mass %.

As the surface treatment method using the metal compound (2), it is possible to employ various types of known methods which are in common use, for example, it is possible to employ a method of precipitating hydroxides of the metals described above on the surface of the titanium dioxide by performing neutralization after adding a water-soluble compound of metals described above into an aqueous slurry of titanium dioxide, and then performing filtering and drying.

[Step (b)]

In step (b), a powder is obtained by drying the reaction solution which is obtained in step (a-1) described above, the mixture which is obtained in step (a-2) described above, or the surface-treated titanium dioxide particles which are obtained in step (a-3) described above.

Examples of the manufacturing methods of the powder include a method of forming the powder using processes such as grinding and classifying solids obtained after the reaction solution and the mixture of the present embodiment are heated and dried at a predetermined temperature and the water or the solvent is removed, a method of forming a powder using processes such as grinding and classifying solids obtained after removing and drying the water or the solvent at low temperatures such as a freezing and drying method and then heating and drying at a predetermined temperature, a method of filtering and drying aggregations by adding a poor solvent such as methanol, a method using a spray dryer to obtain a powder by spraying complex fine particles of 10 μm or less using a spray drying apparatus (a spray dryer) and evaporating the solvent, and the like.

In a case where the reaction solution which is obtained in step (a-1) described above is used, a sol-gel reaction is completed by heating and drying and a metal compound is formed. The heating temperature for completing the sol-gel reaction is room temperature or more and 300° C. or less, more preferably 80° C. or more and 200° C. or less.

Here, the state where the sol-gel reaction is completed is ideally a state where the entirety is formed into bonds of M-O-M; however, states where a part of the alkoxyl group (M-OR$^2$) and M-OH group remain and which transition to a solid (gel) state are included.

In a case where the mixture which is obtained in step (a-2) described above is used, the metal compound nanoparticles are aggregated and bonded by heating and drying. The heating temperature for promoting the aggregation and bonding of the metal compound nanoparticles is preferably room temperature or more and 300° C. or less, more preferably 80° C. or more and 200° C. or less.

In a case where the surface treated titanium dioxide particles which are obtained in step (a-3) described above are used, the heating temperature is preferably room temperature or more and 300° C. or less, more preferably 80° C. or more and 200° C. or less.

[Step (c)]

In step (c), the powder which is obtained in step (b) is fired.

The firing temperature is preferably 300° C. or more and 1000° C. or less, more preferably 400° C. or more and 1000° C. or less, even more preferably 500° C. or more and 800° C. or less, and particularly preferably 500° C. or more and 600° C. or less. When the firing temperature has the above-described lower limits or more, it is possible to sufficiently advance the forming of the titanium dioxide crystals. On the other hand, when the firing temperature has the above-described upper limits or less, it is possible to suppress the excessive sintering of the titanium dioxide crystals and the collapse of the porous structure. The firing may be performed at a constant temperature and may be heated gradually from room temperature. The time of the firing is varied according to the temperature; however, a range from 1 hour to 24 hours is preferable. The firing may be performed in air and may be performed in an inert gas such as nitrogen, or argon. In addition, the firing may be performed under reduced pressure or in a vacuum.

The metal compound (1) which is used as the white pigment of the present embodiment does not easily precipitate in the aqueous solution and has excellent whiteness. The principle of this is not clear; however, it is presumed to be because the porous structure is preserved by unevenly distributing the metal compound (2) on the surface of the titanium dioxide and preventing the excessive growth of the crystals of the titanium dioxide during firing, and the pore volume is in the appropriate range.

[Step (d)]

In step (d), the metal compound (1) which is obtained in step (c) described above is wet milled to a desired particle diameter, dispersed into water, and an aqueous dispersion is obtained.

With the object of creating an aqueous dispersion which has a pigment with a desired particle diameter, it is possible to use a grinding and dispersing machine such as a bead mill, a jet mill, a ball mill, a sand mill, an attritor, a roll mill, an agitator mill, a henschel mixer, a colloid mill, an ultrasonic homogenizer, an angmill, or the like. Before filling the grinding and dispersing machine described above, pre-grinding may be performed using a mortar. In addition, a mixer for pre-mixing may be used. With respect to the next step, it is possible to use the aqueous dispersion as it is; however, it is possible to use centrifugation, pressure filtration, vacuum filtration or the like in order to remove trace amounts of coarse particles.

It is not essential to add a surfactant or a dispersing agent in order to stabilize the dispersion; however, for example, anionic surfactants, cationic surfactants, amphoteric surfactants, nonionic surfactants, polymer dispersing agents, and the like may also be present during the grinding and dispersing process.

Examples of the anionic surfactants include carboxylates, simple alkyl sulfonates, modified alkyl sulfonates, alkyl allyl sulfonates, alkyl sulfate ester salts, sulfated oils, sulfuric acid esters, sulfated fatty acid monoglycerides, sulfated alkanol amides, sulfated ethers, alkyl phosphate ester salts, alkyl benzene phosphonate salts, naphthalene sulfonate-formalin condensates, and the like.

Examples of the cationic surfactants include simple amine salts, modified amine salts, tetraalkyl quaternary ammonium salts, modified trialkyl quaternary ammonium salts, trialkyl benzyl quaternary ammonium salts, modified trialkyl benzyl quaternary ammonium salts, alkyl pyridinium salts, modified alkyl pyridinium salts, alkyl quinolinium salts, alkyl phosphonium salts, alkyl sulfonium salts, and the like.

Examples of the amphoteric surfactants include betaine, sulfobetaine, sulfate betaine, and the like.

Examples of the nonionic surfactants include monoglycerin fatty acid esters, polyglycol fatty acid esters, sorbitan fatty acid esters, sucrose fatty acid esters, fatty acid alkanol amides, fatty acid polyethylene glycol condensates, fatty acid amide polyethylene glycol condensates, fatty acid alcohol polyethylene glycol condensates, fatty acid amine polyethylene glycol condensates, fatty acid mercaptan polyethylene glycol condensate, alkyl phenol polyethylene glycol condensates, polypropylene glycol polyethylene glycol condensates, and the like. It is possible for these surfactants to be used alone or in a combination of two or more types, and it is possible to use other additives therewith.

In addition, in order to suppress the foaming during the grinding and dispersing, an anti-foaming agent may be added. Examples of the anti-foaming agent include silicone-based agents, polyether-based agents, alcohols, and the like. It is possible to use these anti-foaming agents alone or in a combination of two or more types. The order in which the dispersing agent is added is not particularly limited; however, it is preferably added either before or after step (d).

The peak value of the volume particle size distribution of the metal compound (1) which is measured by the dynamic light scattering method is in a range of 100 to 700 nm as described above.

Regarding the pore volume of the metal compound (1) of the present embodiment, (C) the pore volume is in a range of 0.1 ml/g or more and 0.65 ml/g or less as described above. It is considered that such a structure may be achieved by adopting a so-called core-shell structure where the titanium dioxide fine particles described above are coated with the metal compound (2), or a structure where fine particles of the metal compound (2) are interposed between the titanium dioxide fine particles.

It is known that there is a possibility that the titanium dioxide fine particles will be easily crystallized and particle growth will occur during the firing step. When the so-called particle growth occurs, there is a high possibility the particles will have a small pore volume.

In the present embodiment, due to the presence of the metal compound (2), the crystal growth of the titanium dioxide fine particles is suppressed, and as a result, it is considered that so-called porous particles with a large pore volume are obtained.

In addition, the refractive index of the metal compound (2) of the present embodiment is 1.60 or more and 2.45 or less. It is known that, typically, components which have a lower refractive index tend to have lower whiteness. However, the aqueous ink white pigment of the present invention has good whiteness. This is also presumed to be a result of having the structure as described above.

The specific gravity of the metal compound (2) of the present embodiment is preferably 3.0 g/cm$^3$ or more and 6.0 g/cm$^3$ or less.

Normally, when a component with a specific gravity which is higher than water is used, it is generally considered that the dispersibility as an aqueous ink is decreased. However, the aqueous ink white pigment of the present embodiment has good dispersibility relative to water. This is also presumed to be a result of forming the structure as described above. In addition, from the presumption that components with a high specific gravity have a tendency for the particle growth rate to be slow due to the low mobility thereof, it is presumed that the forming of the structure described above is preferable.

Then, by including insulating material such as silica in the titanium oxide in existing products, the photocatalytic function of the titanium oxide is suppressed, a decrease in whiteness derived from the photocatalytic function is prevented, and the whiteness is maintained. Even when zirconium dioxide, zinc sulfide, ZnO, white lead, aluminum oxide, $Y_2O_3$, and $BaSO_4$, which are the metal compounds (2) according to the present invention, are contained in titanium oxide, the effect is the same, and it is presumed that it is possible to maintain the whiteness.

2. Aqueous Ink Composition

The aqueous ink composition of the present embodiment includes the aqueous ink pigment described above and water. Furthermore, water-soluble organic solvents, lubricants, polymer dispersing agents, surfactants, other coloring agents, and various types of other additives may be included.

The added amount of aqueous ink pigment of the present embodiment is preferably 1 wt % or more and 40 wt % or less with respect to the entirety of the ink, more preferably 3 wt % or more and 30 wt % or less. In the present embodiment, even in a case where the pigment concentration is high, the dispersibility and the clogging reliability of the pigment particles are excellent and an image with a good covering property is obtained by increasing the pigment concentration in the ink.

Examples of the solvent of the aqueous ink composition of the present embodiment include water or mixed solvents of water and water-soluble organic solvents. As the water, it is possible to use pure water or ultra-pure water such as ion-exchanged water, ultrafiltered water, reverse osmosis water, distilled water or the like. In addition, by using water which is sterilized using ultraviolet irradiation or the addition of hydrogen peroxide, it is possible to prevent the generation of mold or bacteria in a case where the ink composition is stored for a long period, which is preferable. In addition, the water-soluble organic solvent is preferably a low boiling point organic solvent, examples of which include methanol, ethanol, n-propyl alcohol, iso-propyl alcohol, n-butanol, sec-butanol, tert-butanol, iso-butanol, n-pentanol, and the like. Monovalent alcohols are particularly preferable. The low-boiling-point organic solvent has the effect of shortening the drying time of the ink. The amount of the low-boiling-point organic solvent is preferably 0.5 wt % or more and 10 wt % or less of the aqueous ink composition, more preferably 1.5 wt % or more and 6 wt % or less.

The aqueous ink composition of the present embodiment preferably further includes a wetting agent such as a high boiling point organic solvent. Preferable examples of the wetting agent include polyhydric alcohols such as ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylol ethane, and trimethylol propane; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and the like.

The amount of the wetting agent to be added is preferably 0.5 wt % or more and 40 wt % or less of the aqueous ink composition, more preferably 2 wt % or more and 20 wt % or less.

The aqueous ink composition of the present embodiment preferably includes a polymer dispersing agent. Examples of the polymer dispersing agent include natural polymers. Specifically, proteins such as glue, gelatin, casein, and albumin; natural gums such as gum arabic and gum tragacanth; glucosides such as saboni, alginic acid derivatives such as alginic acid, sodium propylene glycol alginate, triethanolamine alginate, and ammonium alginate; cellulose derivatives such as methylcellulose, carboxymethyl cellulose, hydroxyethyl cellulose, and ethyl hydroxyethyl cellulose; and the like.

Furthermore, preferable examples of the polymer dispersing agents include synthetic polymers, including polyvinyl alcohols, polyvinylpyrrolidones, acrylic resins such as polyacrylic acid, acrylic acid/acrylonitrile copolymers, potassium acrylate/acrylonitrile copolymers, vinyl acetate/acrylic ester copolymers, acrylic acid/acrylic ester copolymers, styrene-acrylic resins such as styrene/acrylic acid copolymers, styrene/methacrylic acid copolymers, styrene/methacrylic acid/acrylic ester copolymers, styrene/α-methylstyrene/acrylic acid copolymers, and styrene/α-methylstyrene/acrylic acid/acrylic ester copolymers, styrene/maleic acid copolymers, styrene/maleic anhydride copolymers, vinyl naphthalene/acrylic acid copolymers, and vinyl naphthalene/maleic acid copolymers, vinyl acetate copolymers such as vinyl acetate/ethylene copolymers, vinyl acetate/fatty acid vinyl/ethylene copolymers, vinyl acetate/maleic acid ester copolymers, vinyl acetate/crotonic acid copolymers, vinyl acetate/acrylic acid copolymers and salts thereof. Among these, in particular, copolymers of a monomer which has a hydrophobic group and a monomer which has a hydrophilic group and polymers formed of monomers which have both a hydrophobic group and a hydrophilic group in the molecular structure are preferable, for example, styrene/acrylic acid copolymers, styrene/methacrylic acid copolymers, and the like.

The ink composition of the present embodiment may further include a surfactant. Examples of the surfactants include the surfactants exemplified in step (d). It is possible for these surfactants to be used alone or as two or more types. In order to improve the fixing property to the recording medium or the water resistance, a polyolefin wax may be added. Other than these, a pH adjusting agent, a preservative, a fungicide, an antioxidant, a fixing resin, or the like may be added according to necessity.

In addition, in the present embodiment, it is possible to set a light color ink by adding an appropriate amount of a pigment and/or a dye other than the aqueous ink pigment of the present embodiment.

It is possible for the ink composition of the present embodiment to be manufactured by dispersing and mixing each of the components described above using an appropriate method. After preparing a solution where each of the ink components are added and stirring thoroughly, it is possible to obtain the ink composition which is the object by performing filtration in order to remove coarse particles and foreign matter which cause clogging. For example, it is possible to manufacture the ink composition by appropriately adding additives and the like to the aqueous dispersion which is obtained in step (d) described above according to necessity.

Examples of the applications of the aqueous ink composition of the present embodiment include ink jet printing, offset printing, gravure printing, and the like, and the aqueous ink composition is particularly suitable for printing with ink jet printers.

3. Images and Printed Matter

Images and printed matter are obtained by printing onto a substrate (a printing target) using the aqueous ink composition of the present invention. Examples of the substrate include paper, textile products, plastics (including polyolefins and the like such as vinyl chloride, polyethylene terephthalate, polyethylene, and polypropylene), glass, ceramics, metal and the like.

It is possible for the aqueous ink composition of the present embodiment to favorably cover a base. Furthermore, in a case where the aqueous ink composition of the present embodiment is a white ink, images or printed matter are obtained with a high whiteness. In addition, after printing with the aqueous ink composition of the present embodiment, it is possible to obtain a favorable color property in the white ink by performing printing using various types of colored inks.

Above, description has been given of embodiments of the present invention; however, these are examples of the present invention and it is possible to adopt various configurations other than those described above.

[Embodiments]

Below, further detailed description will be given of the present invention using Examples; however, the range of the present invention is not limited to these Examples or the like.

EXAMPLE 1

(Synthesis of Zirconium Dioxide-Containing Titanium Dioxide Nanoparticles and Preparation of Aqueous Dispersion)

120 g of titanium chloride (IV) solution (Wako Pure Chemical Industries, Ltd., Ti: approximately 15%) (Ti: $3.76 \times 10^{-1}$ mol equivalent) was added to 4000 ml of ion-exchanged water and stirred at a temperature of 70° C. After one hour, a bluish titanium dioxide aqueous colloidal solution was obtained. 15.6 g of zirconium chloride oxide octahydrate (Zr: $4.83 \times 10^{-2}$ mol equivalent) were added to the colloidal solution, the temperature of the aqueous colloidal solution was kept at 70° C., and stirring was performed for one hour. As a result, a bluish white sol solution was obtained. An aqueous dispersion of zirconium dioxide-containing titanium dioxide nanoparticles with a solid content concentration of 6 wt % was obtained by cleaning such that the pH of the aqueous colloidal solution is in the vicinity of 2.5 according to ion dialysis. When the powder which was obtained by drying the aqueous dispersion was analyzed by X-ray diffraction spectrum measurement using an X-Ray diffractometer Multiflex 2 kW (CuKα ray λ=1.5418 Å) manufactured by Rigaku Corp. and was analyzed by the Debye-Scherrer method with a Scherrer constant of 0.9, it was confirmed that the structure was a crystal structure of anatase type titanium dioxide and the crystal size was approximately 3 nm.

(Formation of Zirconium Dioxide-Containing Titanium Dioxide Powder)

By pouring an aqueous dispersion of zirconium dioxide-containing titanium dioxide nanoparticles with a solid content concentration of 6 wt % into a spray dryer apparatus, applying pressure (0.2 MPa) at a nozzle outlet temperature of 200° C., and performing spraying and drying, a zirconium dioxide-containing titanium dioxide powder was obtained. The obtained powder was heated using an electric furnace from room temperature to 500° C. at 5° C. per minute in an air atmosphere, and a sintered body of zirconium dioxide-containing titanium dioxide powder was obtained by further firing for 2 hours at 500° C. When the sintered body was observed using scanning electron microscopy (SEM), it was confirmed that the sintered body was a powder of 0.5 to 20 μm. When the sintered body was analyzed using the X-ray diffraction method in the same manner as described above, the sintered body had a crystal structure of an anatase type titanium dioxide and the crystal size was 5.6 nm.

(Preparation of Aqueous Slurry)

A sintered body of zirconium dioxide-containing titanium dioxide powder was subjected to a grinding and dispersing process in water using a wet bead mill such that the solid content concentration was 10 wt %. Grinding was performed while confirming the particle size and a slurry was recovered at the point of time when the peak of the volume particle size distribution became 270 nm.

EXAMPLE 2

A sintered body of zirconium dioxide-containing titanium dioxide powder which was obtained with the same method as Example 1 was subjected to a grinding and dispersing process in a sodium hydroxide aqueous solution using a wet bead mill such that the solid content concentration was 19 wt % and the pH was in the vicinity of 9. Grinding was performed while confirming the particle size and a slurry was recovered at the point of time when the peak of the volume particle size distribution became 240 nm.

EXAMPLE 3

A sintered body of zirconium dioxide-containing titanium dioxide powder which was obtained with the same method as Example 1 was subjected to a grinding and dispersing process in an aqueous solution which included sodium hydroxide and a dispersing agent (SHALLOL AN103P manufactured by Dai-ichi Kogyo Seiyaku Co., Ltd.) using a wet bead mill such that the solid content concentration was 14 wt %. A dispersing agent was added such that the drying weight was 2 wt % relative to the pigment weight. Grinding was performed while confirming the particle size and a slurry was recovered at the point of time when the peak of the volume particle size distribution became 240 nm.

EXAMPLE 4

A sintered body of zirconium dioxide-containing titanium dioxide powder which was obtained with the same method as Example 1 was subjected to a grinding and dispersing process in an aqueous solution which included sodium hydroxide and a dispersing agent (SHALLOL AN103P manufactured by Dai-ichi Kogyo Seiyaku Co., Ltd.) using a wet bead mill such that the solid content concentration was 18 wt %. The rest was the same as Example 3 except that a dispersing agent was added such that the drying weight was 10 wt % relative to the pigment weight.

COMPARATIVE EXAMPLE 1

(Preparation of Aqueous Slurry)

When aluminum hydroxide-modified titanium dioxide powder (TTO-51 (A) manufactured by Ishihara Sangyo Co., Ltd., aluminum hydroxide content of 20 wt %) was analyzed using an X-ray diffraction method in the same manner as in Example 1, rutile type titanium dioxide was the main component, and the crystal size was 11.1 nm. The aluminum hydroxide-modified titanium dioxide powder described above was subjected to a grinding and dispersing process in water using a wet bead mill such that the solid content concentration was 10 wt %. Grinding was performed while confirming the particle size and a slurry was recovered at the point of time when the peak of the volume particle diameter distribution became 260 nm.

Here, the refractive index of the aluminum hydroxide was 1.57, and the specific gravity was 2.42 g/cm$^3$.

COMPARATIVE EXAMPLE 2

(Preparation of Aqueous Slurry)

Aluminum hydroxide-modified titanium dioxide powder (TTO-51 (A) manufactured by Ishihara Sangyo Kaisha, Ltd., aluminum hydroxide content of 20 wt %) was subjected to a grinding and dispersing process in a sodium hydroxide aqueous solution using a wet bead mill such that the solid content concentration was 17 wt %. Grinding was performed while confirming the particle size and a slurry was prepared. The obtained slurry was highly viscous and preparing the ink was difficult. This was presumably because the aluminum hydroxide was dissolved in the aqueous sodium hydroxide to become a gel-like solution.

COMPARATIVE EXAMPLE 3

Except for not adding zirconium chloride oxide octahydrate, the titanium dioxide nanoparticles were synthesized in the same manner as in Example 1 and a titanium dioxide powder was prepared through steps of drying and firing. When analyzed with the X-ray diffraction method in the same manner as in Example 1, anatase and rutile type titanium dioxide were mixed, with the crystal size of the anatase type being 18.8 nm and the crystal size of the rutile type being 26.3 nm.

A sintered body of titanium dioxide powder which did not include zirconium dioxide was subjected to a grinding and dispersing process in a sodium hydroxide aqueous solution using a wet bead mill such that the solid content concentration was 20 wt % and the pH was in the vicinity of 12.8. Grinding was performed while confirming the particle size and a slurry was recovered at the point of time when the peak of the volume particle size distribution became 300 nm.

EXAMPLE 5

160 g of commercially available titanium dioxide powder (anatase/rutile type, primary particle diameter: 80 nm) were added to 480 g of ion-exchanged water, 160 g of a 10 wt % hexametaphosphate aqueous solution were further added, and stirring was performed at room temperature. 83.7 g of zirconium chloride oxide octahydrate were added to the slurry solution. A sodium hydroxide aqueous solution was slowly added to this slurry solution, the pH was adjusted to 4.0 to 4.5, and then stirred for two hours. The obtained slurry solution was filtered and the solid content was removed and dried. The obtained powder was heated using an electric furnace from room temperature to 500° C. at 5° C. per minute in an air atmosphere, and a sintered body of zirconium dioxide-coated titanium dioxide powder was obtained by further firing for 2 hours at 500° C.

(Preparation of Aqueous Slurry)

The obtained sintered body of zirconium dioxide-coated titanium dioxide powder was subjected to a grinding and dispersing process in an aqueous solution which included sodium hydroxide and a dispersing agent (SHALLOL AN103P manufactured by Dai-ichi Kogyo Seiyaku Co., Ltd.) using a wet bead mill such that the solid content concentration was 20 wt %. At this time, a dispersing agent was added such that the drying weight was 2 wt % relative to the pigment weight so that the pH of the sodium hydroxide was in the vicinity of 8. Grinding was performed while confirming the particle size and a slurry was recovered at the point of time when the peak of the volume average diameter became 309 nm.

EXAMPLE 6

The same processes as in Example 5 were carried except that the titanium oxide was changed to commercially available titanium dioxide powder (anatase type, primary particle diameter: 180 nm), and a slurry was recovered at the point of time when the peak of the volume average diameter was 226 nm.

EXAMPLE 7

The same processes as in Example 5 were carried except that the titanium oxide was changed to commercially available titanium dioxide powder (rutile type, primary particle diameter: 35 nm), and a slurry was recovered at the point of time when the peak of the volume average diameter was 348 nm.

EXAMPLE 8

The same processes as in Example 5 were carried except that the titanium oxide was changed to commercially available titanium dioxide powder (rutile type, primary particle diameter: 15 nm), and a slurry was recovered at the point of time when the peak of the volume average diameter was 267 nm.

COMPARATIVE EXAMPLE 4

The same processes as in Example 5 were carried except that the titanium oxide was changed to commercially available titanium dioxide powder (anatase type, primary particle diameter: 35 nm) and zirconium chloride oxide octahydrate was not added, and a slurry was recovered at the point of time when the peak of the volume average diameter was 257 nm.

COMPARATIVE EXAMPLE 5

The same processes as in Example 4 were carried except that the firing was carried out at 1000° C., and a slurry was recovered at the point of time when the peak of the volume average diameter was 283 nm.

(Slurry Evaluation Method)
(Particle Size Distribution of Slurry)

After the slurries of the Examples and the Comparative Examples were diluted with water such that the solid content concentrations were approximately 0.1 wt % and ultrasound processes were performed for 1 minute, the volume average diameters were measured using a dynamic light scattering type nano-track particle size analyzer (Microtrac UPA-EX150 (Nikkiso Co., Ltd.)).

(Specific Surface Area and Pore Volume)

Powders were recovered by drying the slurries of the Examples and the Comparative Examples, and a specific surface area (BET method) and pore volume measurement were performed with a nitrogen gas adsorption method at the temperature of liquid nitrogen (77K) using an AUTOSORB 3 (manufactured by Quantachrome Co.).

(Dispersibility)

The aqueous dispersion was left to stand and the precipitation state of the particles was evaluated visually.

The evaluation criteria were as follows.

O: The precipitation was gradual; however, even after one week, the water layer and the precipitate were not completely separated.

Δ: The precipitation was gradual; however, even after one day, the water layer and the precipitate were not completely separated.

X: The precipitation was immediate and the water layer and the precipitate were completely separated.

XX: Evaluation was not possible due to the high viscosity.

(Whiteness)

An aqueous composition where drying weight of an acrylic emulsion (Almatex) as a fixing resin was added to be 2 parts by weight relative to a drying weight of 10 parts by weight of the aqueous slurry was coated to have a thickness of 2 to 3 μm on the PET film surface using a bar coater. The PET film was placed on a standard black plate and the whiteness (L* value) was measured using a spectral colorimeter (NF333 manufactured by Nippon Denshoku Kogyo Co., Ltd.). The L* value is an index of whiteness. The evaluation criteria of the whiteness were as follows.

AAA: L* value is 80 or more
AA: L* value is 75 or more and less than 80
A: L* value is 72 or more and less than 75
B: L* value is 68 or more and less than 72
C: L* value is 65 or more and less than 68
D: L* value is less than 65

(Measurement Method of XRD Peak Intensity Ratio)

For the white pigment after firing or the non-fired white pigment, X-ray diffraction measurement of the white pigment after drying was performed using CuKα rays. When the heights from the base lines of the peak of the titanium dioxide which appeared at 24 degree to 29 degree and the peak of the diffraction rays derived from zirconium dioxide which appeared at 29 degree to 32 degree were respectively set as Ia and Ib, the intensity ratio Ib/Ia thereof was calculated.

The evaluation results of the Examples and the Comparative Examples are shown in Table 1 and Table 2. Here, in Table 2, the figures of A and R shown in the column of the crystal particle size of Example 5 and Comparative Example 5 respectively represent the crystal particle sizes of the anatase phase and the rutile phase.

TABLE 1

| | Pigment | Solvent | Concentration (wt %) | pH | Peak of particle size distribution (nm) | Specific surface area (m²/g) | Pore volume (mL/g) | Dispersibility | Whiteness |
|---|---|---|---|---|---|---|---|---|---|
| Example 1 | ZrO₂-containing | Water | 10 | 3.8 | 270 | 98.9 | 0.38 | O | AA |
| Example 2 | TiO₂ | NaOH aqueous solution | 19 | 8.8 | 240 | 98.9 | 0.38 | O | AA |
| Example 3 | (ZrO₂: 20 wt %) | NaOH aqueous solution + SHALLOL AN103P (2 wt % dry/dry) | 14 | 9.0 | 240 | 98.9 | 0.38 | O | AA |
| Example 4 | | NaOH aqueous solution + SHALLOL AN103P (10 wt % dry/dry) | 18 | 8.5 | 240 | 98.9 | 0.38 | O | AA |
| Comparative Example 1 | TiO₂ Manufactured by Ishihara Sangyo Kaisha, Ltd, TTO-51(A) | Water | 10 | 6.2 | 260 | 94.7 | 0.40 | X | D |
| Comparative Example 2 | | NaOH aqueous solution | 17 | 9.3 | 260 | 94.7 | 0.40 | XX | Not measured |
| Comparative Example 3 | TiO₂ | NaOH aqueous solution | 20 | 12.8 | 300 | 1.5 | 0.02 | X | Not measured |

TABLE 2

| | Titanic material | | | | | | |
|---|---|---|---|---|---|---|---|
| | Crystal type | Primary particle diameter (nm) | Surface treating agent | Firing temperature (°C.) | Medium | Concentration (wt %) | pH |
| Example 5 | Anatase/rutile | 80 | $ZrO_2$: 20 wt % hexametaphosphoric acid: 10 wt % | 500 | NaOH aqueous solution + SHALLOL AN103P (2 wt % dry/dry) | 21.6 | 8.5 |
| Example 6 | Anatase | 180 | $ZrO_2$: 20 wt % hexametaphosphoric acid: 10 wt % | 500 | NaOH aqueous solution + SHALLOL AN103P (2 wt % dry/dry) | 21.7 | 8.0 |
| Example 7 | Rutile | 35 | $ZrO_2$: 20 wt % hexametaphosphoric acid: 10 wt % | 500 | NaOH aqueous solution + SHALLOL AN103P (2 wt % dry/dry) | 21.5 | 8.2 |
| Example 8 | Rutile | 15 | $ZrO_2$: 20 wt % hexametaphosphoric acid: 10 wt % | 500 | NaOH aqueous solution + SHALLOL AN103P (2 wt % dry/dry) | 21.7 | 7.4 |
| Comparative Example 4 | Anatase | 35 | $ZrO_2$: 0 wt % hexametaphosphoric acid: 10 wt % | 500 | NaOH aqueous solution + SHALLOL AN103P (2 wt % dry/dry) | 21.5 | 9.1 |
| Comparative Example 5 | Anatase | 35 | $ZrO_2$: 0 wt % hexametaphosphoric acid: 10 wt % | 1000 | NaOH aqueous solution + SHALLOL AN103P (2 wt % dry/dry) | 21.5 | 8.0 |

| | Viscosity (mPa·s) | Peak of particle size distribution (nm) | Specific surface area (m²/g) | Pore volume (mL/g) | Dispersibility | Whiteness | KRD Peak intensity ratio | Crystal particle size (nm) |
|---|---|---|---|---|---|---|---|---|
| Example 5 | 2.1 | 309 | 45.2 | 0.32 | Δ | AAA | 0 | A: 30.2 R: 34.1 |
| Example 6 | 2.1 | 226 | 41.3 | 0.16 | Δ | AAA | 0 | 31.5 |
| Example 7 | 5.7 | 348 | 63.5 | 0.44 | Δ | AA | 0 | 20.5 |
| Example 8 | 4.2 | 267 | 124.5 | 0.52 | ○ | AA | 0 | 13.6 |
| Comparative Example 4 | 49 | 257 | 58.0 | 0.41 | xx | — | 0 | 18.3 |
| Comparative Example 5 | 63 | 283 | 2.40 | 0.01 | xx | — | 0 | A: 45.0 R: 43.0 |

This application claims priorities based on Japanese Patent Application No. 2011-172898 filed on Aug. 8, 2011 and Japanese Patent Application No. 2012-091842 filed on Apr. 13, 2012, the disclosure of which are incorporated herein in its entirety.

The invention claimed is:

1. An aqueous ink white pigment comprising:
a metal compound (1) which satisfies the following conditions of (A), (B), and (C):
(A) The metal compound (1) includes titanium dioxide, and a metal compound (2) where a refractive index at a wavelength of 550 nm is 1.60 or more and 2.45 or less, when the total of the titanium dioxide and the metal compound (2) is 100 wt %, the content of the titanium dioxide is 50 wt % or more and 99 wt % or less and the content of the metal compound (2) is 1 wt % or more and 50 wt % or less;
(B) The peak value of the volume particle size distribution of the metal compound (1) which is measured with a dynamic light scattering method is in a range of 100 to 700 nm;
(C) The pore volume of the metal compound (1) which is calculated with the BJH (Barrett-Joyner-Halenda) method is 0.1 ml/g or more and 0.65 ml/g or less.

2. The aqueous ink white pigment according to claim 1, wherein the specific gravity of the metal compound (2) is 3.0 g/cm³ or more and 6.0 g/cm³ or less.

3. The aqueous ink white pigment according to claim 1, wherein the metal compound (2) is zirconium dioxide.

4. The aqueous ink white pigment according to claim 1, wherein in X-ray diffraction measurement of the aqueous ink white pigment using CuKα rays,
a peak intensity ratio $I_b/I_a$ is 0.02 or less when the strongest peak intensities of diffraction rays which are derived from the titanium dioxide and the metal compound (2) are respectively set to $I_a$ and $I_b$.

5. An aqueous ink composition comprising the aqueous ink white pigment according to claim 1.

6. The aqueous ink composition according to claim 5, wherein the aqueous ink composition is for ink jet printing.

7. Images or printed matter where the aqueous ink composition according to claim 5 is printed on a substrate.

* * * * *